Oct. 19, 1965     L. NAVIAS     3,212,401
INHOMOGENEOUS MAGNESIA-ALUMINA OPTICAL LENS
Original Filed June 1, 1960     3 Sheets-Sheet 2

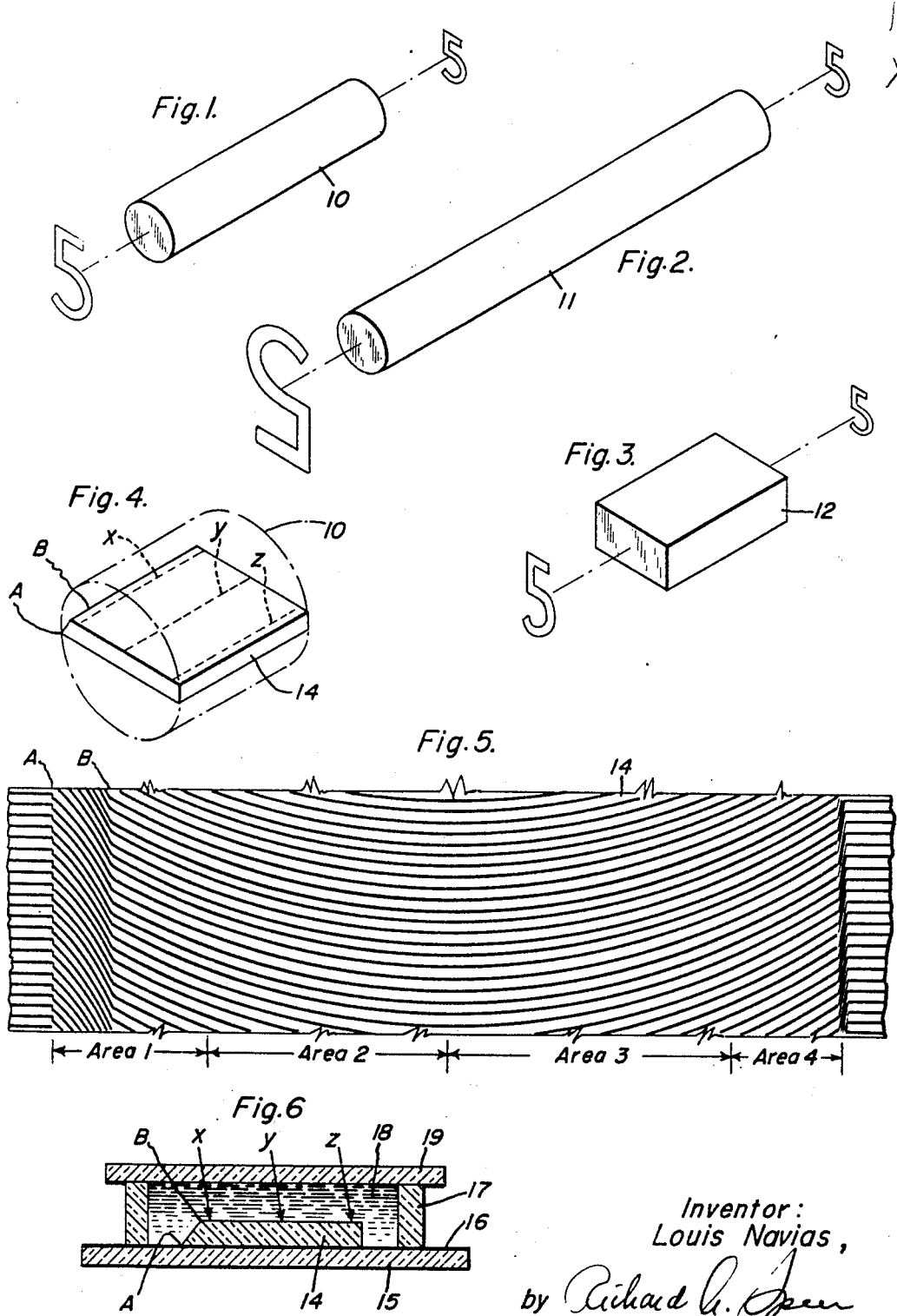
Oct. 19, 1965     L. NAVIAS     3,212,401
INHOMOGENEOUS MAGNESIA-ALUMINA OPTICAL LENS
Original Filed June 1, 1960     3 Sheets-Sheet 1
Inventor:
Louis Navias,
by Richard A. —
His Attorney.

Inventor:
Louis Navias,
by Richard ... 
His Attorney.

Inventor:
Louis Navias,
by Richard C. Speer
His Attorney.

3,212,401
INHOMOGENEOUS MAGNESIA-ALUMINA OPTICAL LENS
Louis Navias, Schenectady, N.Y., assignor to General Electric Company, a corporation of New York
Original application June 1, 1960, Ser. No. 33,270, now Patent No. 3,083,123, dated Mar. 26, 1963. Divided and this application Oct. 3, 1962, Ser. No. 228,176
2 Claims. (Cl. 88—57)

This application is a division of my copending application Serial No. 33,270, filed June 1, 1960 (now Patent No. 3,083,123) and assigned to the same assignee as the present invention.

The present invention relates generally to high-temperature processing of ceramic materials and is more particularly concerned with novel magnesia-alumina spinel articles.

The magnesia-alumina system has beeen rather extensively investigated in the prior art. Accordingly, magnesia-alumina spinel (1 MgO-1Al$_2$O$_3$ or MgAl$_2$O$_4$) and solid solutions of magnesia-alumina spinel (MgAl$_2$O$_4$ and Al$_2$O$_3$; MgAl$_2$O$_4$+2 Al$_2$O$_3$; and the like) are well known. Heretofore, it has, however, been generally considered that these products, while interesting scientifically, are of little practical value or utility. Thus, except for refractory purposes as furnace lining material and the like, no use has ever developed for magnesia-alumina spinel but for the unique function of this substance in very small amounts in the method invented by Robert L. Coble for the production of transparent polycrystalline alumina and disclosed and claimed in U.S. Patent No. 3,026,210, granted March 20, 1962, and assigned to the assignee of this case.

I have discovered, surprisingly, that new magnesia-alumina spinel articles having in cross-section a certain critical variation in alumina to magnesia ratio possess inhomogeneous optical lens characteristics. I have also found that these new inhomogeneous optical lenses can be produced from bodies which are initially translucent as well as from bodies which are transparent but initially devoid of any optical lens property. Still further, I have discovered that articles having novel combinations of physical properties may be made by forming layers of magnesia-alumina spinel on a body of alumina in the form of sapphire, or in the form of the novel polycrystalline transparent alumina disclosed and claimed in the aforesaid Patent No. 3,026,210, or in the form of another coherent alumina mass such as the sintered opaque polycrystalline bodies known in the prior art.

My fundamental discovery which made the foregoing discoveries possible and which together with those discoveries constitute the basis for this invention is that under certain highly critical conditions magnesia-alumina spinel can be produced by a gas-solid reaction. Thus quite unpredictably I have found if magnesium oxide vapor in a hydrogen atmosphere is brought into contact with an aluminum oxide body, there will be a chemical reaction with the result that magnesia-alumina spinel will be formed. This reaction, however, will not occur in the absence of hydrogen. In addition, I have found that magnesia vapor can be produced at any convenient location with respect to the alumina body, the important requirement being that the magnesia vapor is brought into contact and maintained in contact with the alumina body for time sufficient under the temperature and other important conditions to permit conversion or spinelization to the desired extent. Accordingly, the magnesia vapor may be formed at a point relatively remote from the alumina body by simultaneously heating a magnesia mass and flowing a stream of hydrogen constantly in contact with that mass and then flowing the hydrogen stream bearing magnesia vapors in contact with the alumina body. Alternatively, satisfactory and even comparable rates of conversion of alumina to spinel can be obtained by heating a mass of magnesia in a stagnant hydrogen atmosphere under which the body of alumina to be converted is also maintained in suitably relatively short spaced relation to the magnesia vapor source.

The unique and hitherto unknown and unpredicted gas-solid reaction between magnesia and alumina takes place in an alumina body or at the surface thereof with the result that there is a comparatively rapid penetration of the reaction effect into the deepest portion of the alumina body even where that body is of essentially maximum theoretical density as in the case of a sapphire crystal or the transparent polycrystalline alumina of Patent No. 3,026,210. Thus, while there may be a significant variation in the rate of the spinel conversion or spinel reaction or spinelization of the alumina body, depending upon the porosity or the density of that body, ultimately the conversion will be complete and it will be impossible to determine the nature of the original alumina body from any examination or analysis of the final article. Further, the gas-solid reaction of this invention can be used to convert part or all the alumina of an alumina body which contains impurities as in the case, for example, of a sintered body wherein the matrix is alumina.

Broadly, in its method aspect the present invention comprises the novel step of bringing magnesia vapor in a hydrogen atmosphere into contact with a mass of alumina at a temperature which is sufficiently high and for a time which is sufficiently long that the alumina body is converted to spinel to the extent desired. If only a relatively thin coating of spinel is desired, the conditions may be selected for best control to produce such a coating with the required precision and this may suitably involve subjecting the surface of the alumina body to a temperature of about 1500° C., which represents the minimum temperature at which this novel gas-solid reaction will go forward at more than a negilible rate. On the other hand, where it is desired to form a comparatively heavy layer of spinel or where it is desired to convert the alumina body entirely to spinel, the temperature to which the alumina body is subjected should approach 1900° C. which represents for practical purposes the upper limit at which this gas-solid reaction may be effectively carried out.

More specifically, the method of this invention comprises steps of first forming magnesia vapor as by flowing hydrogen in contact with a magnesia mass at an elevated temperature, and then bringing the resulting magnesia vapor-containing hydrogen into contact with the alumina body which is to be spinelized. Again, these sequential steps will preferably be carried out under conditions which will lead to the maximum rate of production of spinel coatings or spinel articles consistent with the desired control. Vaporization of magnesia will occur at a sufficiently rapid rate for the purposes of practical use of this new gas-solid spinel reaction process if the temperature of the magnesia vapor source is above 1000° C. Operating at that temperature, however, will require considerable heat input to the hydrogen-magnesia vapor mixture as it is brought into contact with the alumina body in view of the 1500° C. minimum for the conversion of alumina to spinel in accordance with the process of this invention.

The time required for the desired spinel conversion by this process will generally vary inversely as the temperature at the area of contact of the magnesia vapor with the alumina body. Accordingly, for significant spinel conversion results in terms of depth of penetration of the reaction into a dense alumina body, such as sapphire, a period of four hours is required at an operating temperature of about 1500° C. The much greater rate of gas-solid spinel reaction at 1900° C. enables the production of the same result, i.e. the same extent of magnesia-alumina formation, in fifteen to thirty minutes. Again, it is a matter for the selection of the operator as to what combination of time and temperature are to be employed in a given operation embodying this new method of my invention and it is only vital to obtaining the new results of this invention that the temperature at which the reaction is carried neither be lower than 1500° C. nor higher than 1925° C. which represents the temperature at which the magnesia-alumina eutectic is formed. For practical purposes, in carrying out this new process, the upper limit of temperature to which the alumina body surface is subjected should not exceed about 1900° C. because it is difficult even in small scale experimental operations to control extremely closely the temperature on the alumina body surface and fluctuations of 10° C. are practically unavoidable over the periods of time involved in carrying out this gas-solid reaction.

While I have not thus far been able to confirm any theory as to the mechanism of this new gas-solid reaction, I believe that it occurs initially at the surface portion of the alumina body. Further I believe that while there is no appreciable penetration of the alumina body by magnesia vapor at any stage of this process, there is a magnesia transport mechanism which occurs through the oxygen sites in the crystal lattice of the alumina body and eventually results in the conversion of the entire alumina body to magnesia-alumina spinel and the increase in volume of the body up to a maximum of 55% providing the conditions essential for the spinel reaction are maintained for a sufficient length of time. This hypothesis serves to explain the gradation of the composition of the spinelized alumina body through its cross section at each and every stage of the present process. The ratio of alumina to magnesia thus increases with increasing depth in the alumina body or distances from the surface of the alumina body which is in contact with the magnesia vapor. Thus, the novel bodies or articles of this invention typically have outer portions which are composed of true magnesia-alumina spinel ($MgAl_2O_4$). Successive inner portions of these bodies are composed of magnesia-alumina spinel solid solutions of increasing alumina content with the innermost portions being made up of solid solutions approaching a maximum of 93% $Al_2O_3$.

This hypothesis does not, however, explain the role of hydrogen in the process of this invention and I now have no explanation for the unique and critical influence of hydrogen upon this gas-solid reaction. I have not been successful in any attempt to carry out this process with any atmosphere which is entirely free from hydrogen. Thus, I have established experimentally that the gas-solid reaction will not occur in either a nitrogen atmosphere or in air, and vacuum is likewise not an equivalent of hydrogen in this invention. But air containing hydrogen is, on the other hand, such an equivalent and so is nitrogen containing hydrogen, and this equivalency is qualitative but approaches quantitative as the ratio of hydrogen in the mixture is increased. It is as though the unique penetration characteristic of hydrogen is involved in promoting this gas-solid reaction, but it could just as well be some special effect of hydrogen upon the alumina crystal lattice, or it could be a combination of both these things.

It will be understood in view of the foregoing that very broadly described the present invention in its article of manufacture aspect consists of a body of magnesia-alumina spinel in which the ratio of alumina to magnesia increases with increasing depth in the article to a maximum in the innermost portion of the article, that is the portion furthest removed from the surface. Also, described in this aspect, the invention contemplates an article composed of an alumina core and provided with a magnesia-alumina coating. The coating may entirely enclose or envelop the body or it may be applied only to a portion of the body for a special purpose. Also, the novel article of this invention may take any desired form, being especially suited to use for optical purposes as a lens, for example, where it is in the form of a rod or bar or even in the form of a flat plate or a plate formed with one or both side surfaces curved. It is also contemplated that a tubular or hollow cylindrical object of magnesia-alumina spinel may be produced for special use.

Those skilled in the art will gain a further and better understanding of this invention from the detailed description of the invention in various preferred embodiments set forth below, reference being had to the drawings accompanying and forming a part of this specification, in which:

FIG. 1 is a schematic, perspective view of a simple optical system including a lens of this invention and illustrating a typical optical characteristic of this new magnesia-alumina spinel article;

FIG. 2 is a view like FIG. 1 showing another article of this invention having a different optical characteristic from that of the FIG. 1 article;

FIG. 3 is another view like FIG. 1 of still another article of this invention having optical properties different in kind from those of the FIGS. 1 and 2 articles;

FIG. 4 is a perspective view of a test slab taken from the article of FIG. 1 for interference microscope examination, a portion of the FIG. 1 article being shown in phantom outline;

FIG. 5 is a photograph of the light fringes of the FIG. 4 test specimen, illustrating by the technique of interference microscopy the refractive index "profile" of the FIG. 1 article;

FIG. 6 is a vertical sectional view of the cell assembly employed in making the interference microscope test, the results of which are illustrated in FIG. 5;

Figure 7:
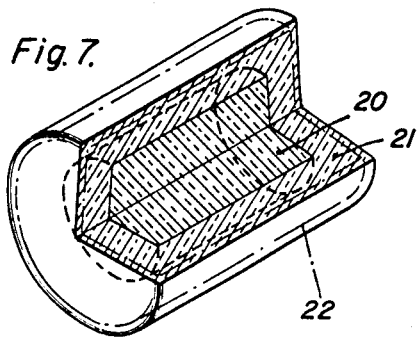
FIG. 7 is a cut-away perspective view of a sapphire rod which by the method of this invention has been provided with a cylindrical spinel envelope.

In accordance with the prior art, as indicated above, magnesia-alumina spinel was produced by a solid-solid reaction. Thus, for example, spinel articles were made by thoroughly mixing together magnesia and alumina powders and firing the mixture at a temperature sufficiently high for the spinel reaction to occur. Alternatively, a body of magnesia and a body of alumina might be brought together and held in contact while the firing operation was carried out so that the solid-solid reaction of the prior art would take place at the interface between the bodies. Some depth of penetration of spinel into the alumina body could be realized by this procedure over relatively long firing periods. The solid-solid reaction, however, does not lend itself to the production of spinel articles having the unique optical properties of those of this invention. These prior art articles were either substantially homogeneous in their composition as in the case of the products of the mixed-powder technique, or they were the opposite extreme, that is, their spine content was isolated and localized, the reaction being confined essentially to the vicinity of the interface between the magnesia and alumina bodies.

My discovery that magnesia-alumina spinel and spinel solid solutions could be produced by a gas-solid reaction thus has, accordingly, for the first time enabled the production of the entirely unique articles of this invention. Additionally, it has made possible my further discovery that spinel articles can be produced which will exhibit hitherto unknown and unpredicted inhomogeneous optical lens characteristics as illustrated in FIGS. 1–3. It has also enabled the production of the unique products illustrated in FIGS. 7–9.

In FIG. 1, a spinel article 10 of this invention is shown in use as an optical lens, the magnifying function of the article being indicated. Article 11 of FIG. 2 differs from that of FIG. 1 only in that it is longer and as a result inverts and reverses the magnified image. Lens device 12 of FIGURE 3, instead of being cylindrical like lenses 10 and 11, is rectangular in transverse cross-section and consequently magnifies only in one plane. The general explanation for these various optical properties is indicated in FIG. 5 wherein the variation in the index of refraction in successive portions across the diameter of article 10 is clearly apparent through examination of test specimen 14 and from article 10 according to FIG. 4. The transition of refractive index is continuous and uniform and as will subsequently be explained is attributable to the corresponding gradation of composition, particularly the alumina content of the article through this transverse cross section, i.e. from one edge to the other of test specimen 14. The refractive index at the center of the specimen is 1.7117, while at the outside edges (indicated as point A) the refractive index is 1.7083 and at the edge of the specimen wedge portion (point B) is 1.7093.

The refractive index profile of FIG. 5 was obtained and measured through the use of a Zeiss interference microscope following the standard technique. Thus, test specimen 14 was mounted on a slide 15 provided with a vapor-deposited aluminum coating 16 having a protective coating of silica (not shown). A glass ring 17 supported on slide 15 enclosed specimen 14 and with the slide provided a vessel to contain an oil body 18 of known refractive index (1.7090 at 24° C.). A glass top 19 closed the vessel full of oil and thus was situated between specimen 14 and the microscope and camera during the actual test. The thickness of specimen 14 was measured at 0.0250 inch at X, 0.02515 inch at Y and 0.0252 inch at Z. The refractive index (RI) values obtained by measurements made on the FIG. 5 micrograph are set forth in Table 1.

TABLE 1

| Area | Fringe Displacement From Basic Fringe | Calculated RI (nearest .0005) |
| --- | --- | --- |
| 1 | 6.85 | 1.7095 |
| 2 | 12.5 | 1.7115 |
| 3 | 2.73 | 1.7075 |
| 4 | ¹4.55 | 1.7080 |

¹ Interpolated.

Referring to FIG. 7, according to this invention, a sapphire rod or cylindrical body 20 was provided with spinel envelope 21 of essentially the same shape as the rod 15 by subjecting the original rod (shown in outline as 22) to contact with a hydrogen atmosphere containing magnesia vapor. In this case, the process was carried on for sixteen hours in a chamber wherein the temperature was maintained at 1800° C. The spinel layer or envelope 21, as illustrated in FIG. 7, is readily detected by means of polarized light, this layer appearing as a highly strained, low birefringent material, whereas the unconverted sapphire body remains quite uniformly a uniaxial crystal. Lack of compatibility (thermal expansion inasmuch) between the inner sapphire and outer surface of spinel may be evidenced by small cracks or gaps between the two parts of the article.

The FIG. 7 article was made by placing the original sapphire rod in a closed molybdenum boat provided with a loose cover, the sapphire rod standing on end on a flat cleaved piece of periclase which in turn was mounted on a high-fired slab of alumina. A flow of sixty cubic feet per hour of hydrogen was maintained throughout the sixteen-hour period of this run and the sapphire rod was heated to temperature in the furnace and cooled in the furnace following the completion of the run.

Figure 8:
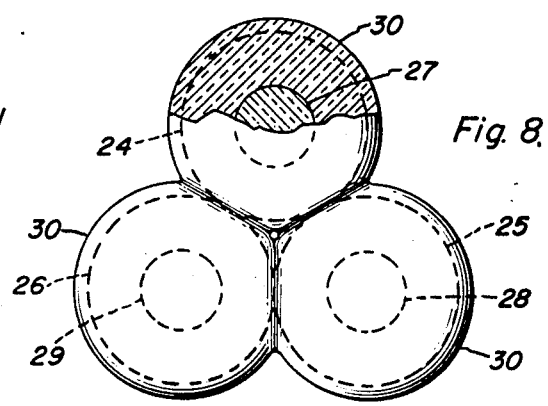
FIG. 8 is a plan view partly in section, of a group of three sapphire spheres which have been bonded together in a cluster by converting their outer portions into spinel.

As illustrated in FIG. 8, three sapphire spheres 24, 25 and 26 (in phantom outline) were subjected to a temperature of 1800° C. for a period of eight hours under a hydrogen atmosphere containing magnesia vapor. The result, as shown in FIGURE 8, was the spinelization and conversion of these spheres into an integral body comprising three separate alumina cores 27, 28 and 29, representing the unconverted portion of the original sapphire spheres, and an outer integral body 30 which envelops all the spheres and bonds them into a single unified element. Body 30 is composed of magnesia-alumina spinel and solid solutions of spinel which are progressively richer in alumina toward the central sapphire cores 27, 28 and 29. Here again, the gas-solid spinel reaction of this invention has taken place substantially uniformly so that the separate core sapphire elements are of approximately the same size and are provided with approximately outer coatings of the same thickness of spinel; that is, they are centrally located with respect to their separate lobes of body 30.

Figure 9:
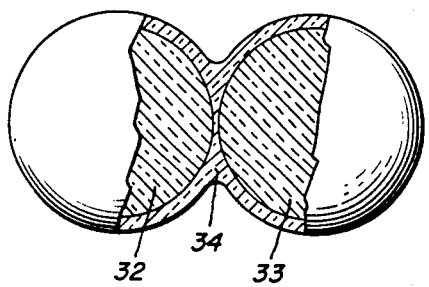
FIG. 9 is a view, partly in section, of two sapphire spheres whose surfaces have been spinelized in accordance with this invention so that the spheres are integrally bonded together.

The relationship existing between the lobes of body 30 is illustrated in FIGURE 9 where sapphire spheres 32 and 33 are shown as integrally bonded together in an envelope of spinel 34 which has been formed through the gas-solid reaction and process of this invention. The illustrated result was obtained under a hydrogen atmosphere containing magnesia vapor, the reaction chamber being maintained at 1900° C. (±10° C.) throughout the reaction period.

In each of the cases illustrated in FIGS. 8 and 9, the source of the magnesia vapor was a body of magnesia disposed out of contact with the original sapphire spheres, but within the same chamber and the magnesia vapor was delivered into contact with the sapphire spheres by means of hydrogen gas which was flowed constantly and at a uniform rate into and through the chamber. As in the case of the articles of FIG. 7, the rate of flow of hydrogen was sixty cubic feet per hour and the vessel used was a molybdenum boat, but the corundum spheres were supported on the floor of the boat instead of on the platform described above. Each of the spheres of FIG. 8 grew from an original diameter of 62½ to 72 mils during the course of the run, due to the addition of magnesia to the alumina lattice.

Figure 10:
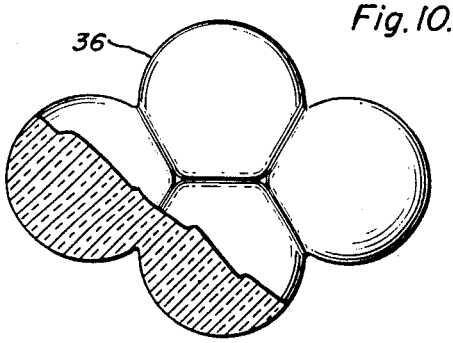
FIG. 10 is a view like FIG. 8, showing a cluster of four spinel spheres prepared from four separate sapphire spheres in accordance with the process of this invention.

Four-lobed body 36 of FIG. 10 was produced after the manner described in relation to FIG. 8 except that in this instance four sapphire spheres (not shown) were subjected to a temperature of 1900° C. for eight hours in a hydrogen atmosphere in the presence of a source of magnesia vapor. As the drawing shows, the conversion to spinel has been complete and the lobes are all integrally joined together with no openings remaining between them. Thus, the point contacts originally existing between the separate spheres have become planes of contact and the spaces between the spheres have been completely filled in through the expansion of the solid volume attending the spinel conversion.

Figure 12:
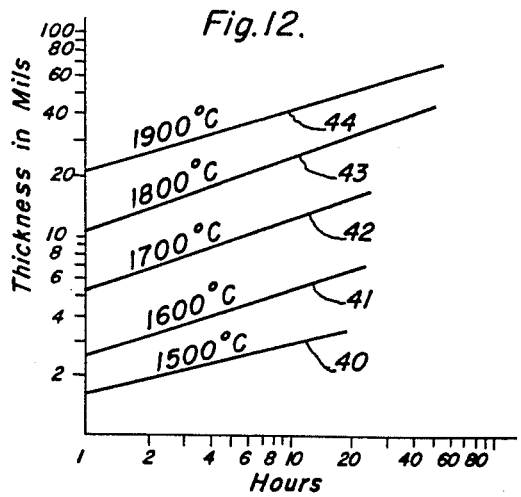
FIG. 12 is a chart bearing five curves illustrating the data gathered in the course of spinelization operations of this invention on clear sapphire at temperatures of from 1500° C. to 1900° C. for periods of time of from one hour to nearly sixty hours.

The time and temperature of the rate of spinel conversion by present gas-solid reaction method is shown in FIG. 12. On this chart, the thickness in mils of the spinel rim formed on a sapphire body is plotted against the time in hours on a logarithmic scale. The data gathered in actual experimental operations for runs at 1500° C., 1600° C., 1700° C., 1800° C. and 1900° C. are illustrated by curves 40, 41, 42, 43, and 44, respectively. From this chart, it is apparent that temperature is a highly critical factor in this process, the gas-solid reaction proceeding at a comparatively greater rate as the temperature approaches a maximum of 1900° C., and going at an almost negligible rate when the temperature approximates 1500° C. Thus, a four hour run at 1500° C. results in the formation of a spinel coating only a little more than two mils thick on the sapphire body, while a coating of about 30 mil thickness results where the conditions are otherwise the same except for the temperature being 1900° C. in the vessel throughout the period.

The data illustrated by these five curves were obtained through the use of equipment, generally as described above, a loosely covered molybdenum boat being used and a hydrogen atmosphere being maintained in the boat wherein a periclase body is mounted on an alumina slab and the sapphire rod-like specimens are disposed in upright position, standing on top of the periclase block. The flow of hydrogen, again, was at the rate of sixty cubic feet per hour and was maintained uniformly throughout the run in every instance.

Figure 11:
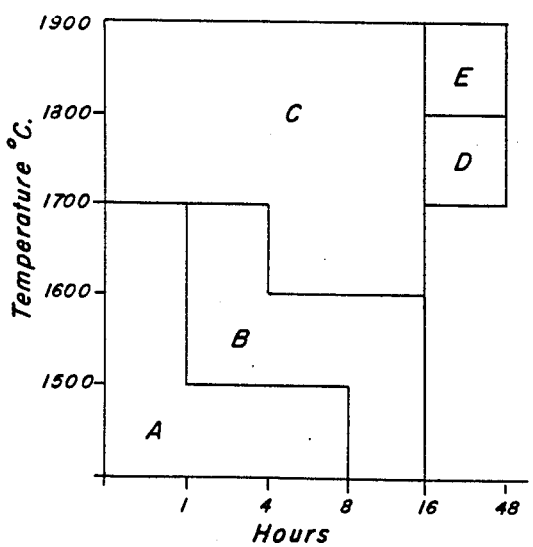
FIG. 11 is a diagram illustrating the effects of the time and temperature factors upon the course of the gas-solid reaction of the process of this invention.

The progress of the gas-solid spinel reaction of the process invention in a typical case is illustrated in FIGURE 11, where polycrystalline fused alumina slabs were employed and observations were made of the effects of the time and temperature factors. The physical appearances of the slabs at the various stages of firing are represented by the Areas A, B, C, D and E on the drawing. Thus Area A represents the samples on which only a thin spinel "glaze" was developed, while Area B represents samples on which the spinel glaze covered the entire tops of the slabs and extended over their edges and down their sides, and showed no craze. The samples of Area C had thicker spinel layers and these were definitely crazed on the top and side surfaces. At maximum temperature (1900°) and for times up to 16 hours, the spinel layer was truly smooth, vitreous in appearance and shiny. When firing was continued up to 48 hours at 1800° and 1900° C., represented by Areas D and E respectively, the spinel surfaces appeared highly crystallized. Craze lines ran across the crystal areas of these latter samples, indicating that the crazing occurs after the crystals had been developed on cooling. The D Area samples had a crystallized craze layer on the top and sides only while the Area E samples also had developed it on the bottom and the crystal pattern of the Area E samples consisted of much larger crystals than the Area D samples.

Figure 14:
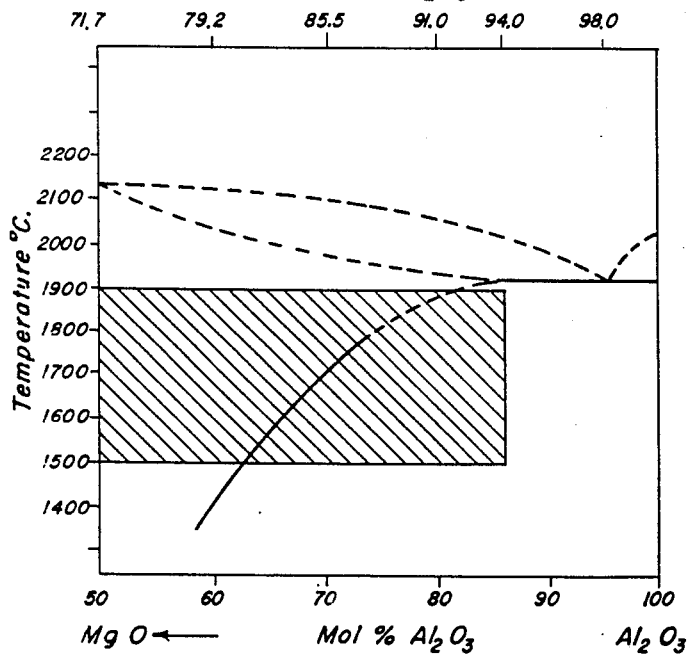
FIG. 14 is the $MgO$-$Al_2O_3$ phase (partial) diagram, marked to indicate the area in which the process and the products of this invention are located.

The phase diagram of FIG. 14 serves to illustrate the system $MgO$-$Al_2O_3$ and shows why the range of alumina in the articles of this invention is between 71.7% and 94%. Operating at temperatures below 1925° C. and using this new gas-solid reaction process, magnesia-alumina spinel is formed as an initial product representing 71.7 weight percent $Al_2O_3$ and 28.3 weight percent $MgO$, that is 50 mol percent of each component. As the process is continued, the various solid solutions of spinel and alumina are produced, the alumina decreasing in amount from a maximum of 94 weight percent to the 1 $MgO$-1 $Al_2O_3$ spinel ratio as the reaction proceeds.

I have found in carrying out experiments paralleling in every respect to those set forth in detail above, except for the atmosphere employed, that hydrogen is an absolute essential to this process of my invention and the novel gas-solid reaction. Where hydrogen was not employed, there was no spinel formed except in the region of the interface where the sapphire body rested on the surface of the periclase block. The penetration of the magnesia-alumina spinel into the sapphire body was by slow progression and there was a gradual decrease in penetration rate as the thickness of spinel increased. There was no indication of any tendency for spinel to develop other than in this interface region and inwardly and upwardly therefrom. There was no spinel formed on the top and the upper side portions of the sapphire body in any of these runs and there was no indication that the spinel would tend to form more rapidly along the outside surfaces of the sapphire body. In some runs where hydrogen was present due to a leakage into the reaction vessel, there was a tendency for the spinel to form other than in the region of the interface between the sapphire body and periclase block. Where such leakage was excessive spinel was formed over the entire surface of the sapphire body and there was no substantial variation in the thickness of the spinel coating at any stage of the firing operation. This indicates that while the gas-solid spinel reaction will not occur in oxygen or air atmospheres, hydrogen atmospheres containing some oxygen or air will enable the gas-solid reaction to take place at essentially the same rate that it will go forward in an oxygen-free hydrogen atmosphere. As a general rule, the hydrogen content of the atmosphere (neglecting the magnesia vapor content of the atmosphere) should not be less than 50% on a volume basis. Where substantially less than that proportion of hydrogen is present, I have found that the gas-solid reaction is inhibited and slowed to a rate which will not normally be attractive as an alternative to the solid-solid spinel reaction of the prior art. Thus in the practice of this invention I contemplate the use of atmospheres containing hydrogen as the major constituent and in admixtures of two or more gases the hydrogen content will be at least 50% (again, neglecting the magnesia vapor component).

In carrying out the experimental work described above and substituting transparent or translucent polycrystalline alumina, as disclosed and claimed in the aforesaid Patent No. 3,026,210, I have obtained essentially the same results in terms of time, temperature and rate of the gas-solid spinel reaction. However, in carrying out these further experimental investigations, I have found that the conversion to spinel is slower where the alumina body is one of the typical prior art sintered alumina masses which is dense and opaque and transparent outer layers are difficult to develop. The bas-solid spinel reaction is affected to some extent by the presence of pores, grain boundary cracks or the presence of a second phase, but takes place at a rate depending upon time and temperature and upon the constant availability of a sufficient quantity of magnesia vapor at the reacting surface of the alumina body.

I have made no quantitative measure of the magnesia vapor concentration requirements at the reacting surface. This requirement, however, is met without difficulty and in a manner which is self-regulating or automatic, for all practical purposes, by simply providing a block of periclase or similar magnesia source, such as a body of sintered magnesia powder or even loose powder for exposure to the hydrogen atmosphere to serve as the vehicle for transport of the magnesia vapor to the alumina body to be converted.

It does not appear from the results that I have thus far obtained that the rate of the gas-solid spinel reaction can be significantly accelerated by increasing the rate of flow of the magnesia vapor-containing hydrogen atmosphere in contact with the surface of the alumina article. It also does not appear that there is any additive which would be effective when incorporated either in the atmosphere or in the alumina body to increase substantially the rate of the gas-solid spinel reaction.

Those skilled in the art will gain a further and better understanding of this invention from the following illustrative but not limiting examples.

Example I

To test magnesia vapor transport in the process of this invention, a sapphire rod of 0.143" in diameter was supported on a block of periclase which in turn was disposed upon an alumina block. This assembly was enclosed in a molybdenum boat which was subjected to a temperature of 1900° C. for a period of 8 hours under a hydrogen atmosphere. This sapphire rod was 1⅝₁₆" long and extended 1¼₁₆" above the periclase block. At the conclusion of the run the sapphire rod was crazed and cracked over its entire length, the cracks running both radially and spirally on the outer surface where spinel had been forming. The spinel coating was 31.5 mils thick at the rim, and varied from 28.4 to 29.6 mils thick on the circular side.

Example II

In another experiment to determine the mobility of MgO vapor in this process a sapphire specimen was mounted on a polycrystalline alumina block supported by a periclase slab and this assembly was subjected to a furnace temperature of 1900° C. for a period of 8 hours within a loosely covered molybdenum boat. Thus the atmosphere within the boat was hydrogen and the furnace atmosphere was flowing hydrogen. Spinel was formed on the exposed portions of polycrystalline alumina block to an average thickness of 3.8 mils. The sapphire specimen was tightly fixed to the alumina block by a spinel layer which formed on the sapphire body and produced a slight fillet around the bottom edge of the sapphire where it met the alumina block. The spinel rim on the single crystal was 26.5 mils thick on the top surface and 24 mils thick on the side, but no perceptible spinel formed on the bottom portion of the sapphire, where it rested against the top of the alumina block. The crystal boundaries of the polycrystalline alumina block apparently blocked the path of the MgO vapor and consequently slowed the rate of growth or formation of spinel in the polycrystalline alumina.

Example III

A sapphire rod 3½" long and 0.156" in diameter was supported horizontally on molybdenum supports at its ends above a periclase block in a loosely closed molybdenum boat. This assembly was subjected to furnace heat of 1800° for 4 hours, the furnace atmosphere being hydrogen and hydrogen being the atmosphere within the boat. As customary in the operation of a hydrogen furnace and as in Examples I and II above, hydrogen was flowed through the furnace constantly at a uniform rate, in this instance as approximately 60 cu. ft. per hour. At the end of the run the sapphire rod was covered over its entire surface with a crazed or cracked layer of spinel. The central portion of the rod was a clear cylinder of sapphire and thus surrounded by a spinel layer uniformly 13.5 mils thick. This was a gas-solid reaction product, like those above, because the sapphire rod at no point contacted any solid MgO body at any stage of spinelization process of this invention.

Example IV

In a test of this new process on the transparent, polycrystalline alumina disclosed and claimed in the aforesaid Patent No. 3,026,210, a test piece of alumina was placed on the periclase block which in turn rested on a slab of ordinary non-transparent polycrystalline alumina and the assembly was heated under a hydrogen atmosphere in a loosely closed molybdenum boat. The firing temperature was 1900° C. and the time was four hours. The transparent ring test piece of 0.243 inch O.D., wall thickness 49.3 mils and height 0.125 inch was completely transformed into spinel with final dimensions of 0.259 inch O.D., and wall thickness of 57.2 to 59.2 mils. The transformed ring was more transparent, but the transformed ring showed a circular strain pattern under polarized light. Assuming spinel formation of 30 mils from each curved surface, this rate of formation approaches that of 36 mils developed in two sapphire samples (diameter 150 mils) used as controls in this experiment.

Example V

Repeating the experiment of Example IV, except for the substitution of a disk of transparent alumina of 0.520 inch diameter and 80 mils thickness as the test piece, a clear spinel layer 35 mils thick was formed on both flat surfaces leaving a center portion which was quite diffuse and polycrystalline. The boundaries of the in-moving spinel in this case were quite ragged and ill-defined.

As in the case of Example IV, this test piece lost its sharp corners in the transformation to spinel but judging from these tests, spinel penetrates to the same depths and at about the same rate in polycrystalline transparent alumina as it does in sapphire rods.

Example VI

Still another experiment was made under the conditions of Examples IV and V, except that the run was conducted for 16 hours at 1900° C. Transparent test specimen rings and tubing of transparent, polycrystalline alumina were completely spinelized. The original tube measured 0.275 to 0.277 inch O.D. and this increased to 0.298 to 0.300 inch through the spinel transformation. Original wall thickness was 41.3 to 45.3 mils (not concentric and out of round) and the final wall thickness was about 63 mils. It was observed that the spinel tubing was much more transparent than the original sample and the corners were well rounded instead of sharp as at the outset of the test. The end product had a density of 3.58, while the original sample density was 3.96.

This test had as controls three sapphire rods having a diameter from 0.154 to 0.158 inch and these each developed a spinel layer 48 mils thick.

Example VII

In a test designed to determine the susceptibility of porous polycrystalline alumina bodies to the spinelization method of this invention, four cylindrical bodies of different materials were suspended by their ends from molybdenum supports above blocks of periclase and were subjected to a temperature of 1800° C. for four hours in hydrogen. Three of these specimens were rods 3½" long, one or sapphire, another of transparent polycrystalline alumina and a third of fused alumina. The fourth specimen was a tube of the same fused alumina. The sapphire rod developed the normal clear spinel outer layer, while the other three samples developed two concentric rims or layers which were noticeable because they took a higher polish than the central core. In these later cases the outer rim was narrow and transparent while the inner rim was wider and quite indistinct where it met the central core. The data obtained in this experiment are set out in the following table.

TABLE II

| | Diameter (in.) | Outer Rim very clear, Transparent (mils) | Inner Rim Less Clear, Not Transparent (mils) |
| --- | --- | --- | --- |
| 1. High-density $Al_2O_3$ Rod | 0.215 | 2.5 | 11.3 |
| 2. Fused $Al_2O_3$ Tube | O.D. 0.134– I.D. 0.038 | 1.9 | 18.5–19 |
| 3. Fused $Al_2O_3$ Rod | .136 | 1.9–2.5 | 15–15.5 |
| 4. Sapphire Rod | .160 | 13.9 | |

Example VIII

In carrying out the process of this invention for the purpose of developing products having inhomogeneous optical lens characteristics three sapphire rods ¾ inch long, 5¾ inch long and 7 inch long were suspended over periclase blocks in a hydrogen furnace as described in Example VII and fired at 1900° C. for 100 hours. The original diameter of the 7 inch rod was 0.157 inch while that of the 5¾ inch rod was 0.185 inch and the shortest rod initially had a diameter of approximately 0.175 inch. These specimens increased in diameter about 21 to 24% as a result of the spinel conversion. They were each provided with smooth surface finish by centerless grinding and the ends were ground flat and polished for lengthwise examination. Each of these rods exhibited a lens effect, i.e., magnification, but in one instance (7 inch specimen) there was a reversal of the image as well.

In repetition of this test except that the samples were not centerless ground, the optical lens characteristic was found to be in no way affected by the omission of the centerless grinding step.

*Example IX*

In a repetition of the test operation described in Example VIII the lens effects of relatively thin, square and rectangular pieces of both spinelized sapphire and spinelized transparent polycrystalline alumina were investigated. Opposite edges of the fired samples were polished flat for optical tests and all the samples displayed the same lens effect when viewed through the edges. A description of one of these specimens will serve to illustrate this test more fully. The fired body measured 0.777 inch and by 0.812 inch by 0.121 inch. Two opposite edges of this sample were ground flat and polished until they were 0.760 inch apart. An object viewed through these two edges is magnified in one direction only, that is, across the normal dimension of the specimen only as illustrated in FIGURE 3. This phenomenon is attributable to the fact that the spinel component of the spinel alumina solid solution increases across this narrow dimension from outside to inside as though there were an infinite number of layers of continuously changing index of refraction.

*Example X*

Figure 13:
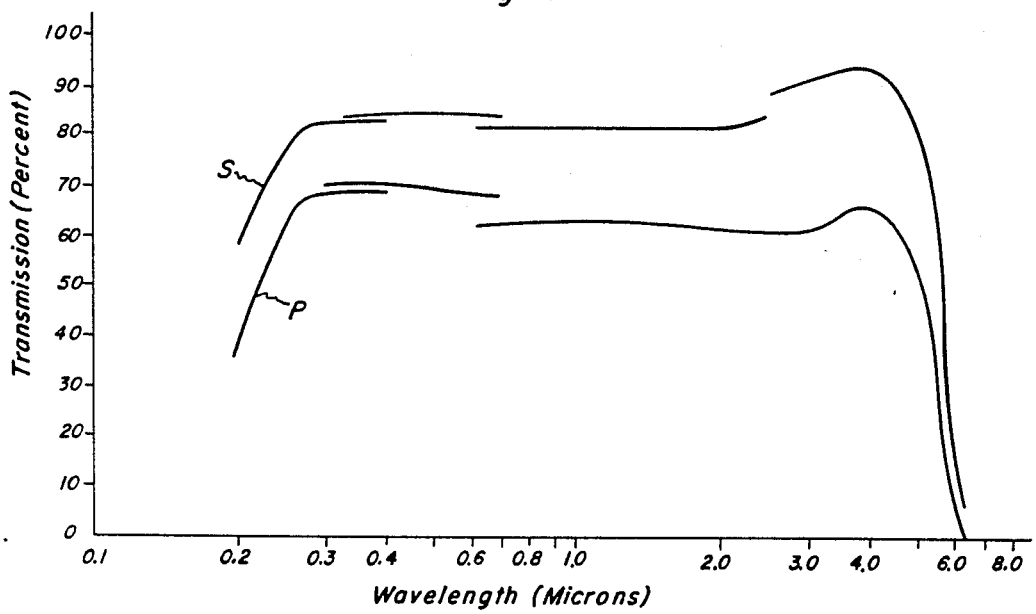
FIG. 13 is a chart bearing curves illustrating the relative transparency of two spinel articles of this invention prepared from a single crystal body and from a polycrystalline body.

In a test of the transparency of the new spinel products of this invention a disc sample of transparent polycrystalline alumina prepared by the method claimed in the aforesaid copending application, and a disc sample of clear sapphire were spinelized and examined for transparency. These samples were placed in a molybdenum boat in spaced relation to each other and to a periclase block as the source of magnesia vapor. The boat, as in the foregoing tests, was provided with a loose-fitting cover so that the hydrogen atmosphere of the furnace had access to the boat contents. With the boat in place in the furnace the firing operation was begun and the furnace temperature was quickly raised to 1900° C. where it was maintained within five to ten degrees for a period of 50 hours. Hydrogen was constantly flowed into the furnace at a substantially uniform rate of 60 cu. ft. per hour throughout the firing period and thereafter until the furnace temperature had dropped below the level where the molybdenum would be subject to catastrophic oxidation in air. The completely spinelized specimens were removed from the boat and while at room temperature were tested for transparency with the results indicated in FIG. 13. The spinel body thus produced from the polycrystalline sample was ground and polished on its faces and was measured to be 2.95 mm. thick and 20 mm. in diameter. The spinel body obtained from the sapphire sample was similarly ground and polished and measured to be 2.59 mm. thick and out-of-round with a maximum dimension of 28.0 mm. and a minimum dimension of 25.0 mm. across. Curve P on the chart of FIG. 13 represents the data gathered in testing the first spinel body while Curve S represents that obtained from examination and test of the spinel body made from the sapphire sample. The light transmission measurements were made on two different instruments which in part accounts for the breaks in curves P and S. The data in the range from 0.2 micron to 2.5 microns were obtained through the use of a Cary Model 14 spectrophotometer manufactured by Applied Physics Corp. A hydrogen source photomultiplier was employed in the 0.2–0.4 micron range while in the 0.4–0.7 micron range a tungsten source was used with the same equipment and in the combined range of 0.2–0.7 micron, the samples were held in a monochromatic light beam. In the 0.7–2.5 micron range the samples were examined in a polychromatic light beam using a tungsten source and a lead sulfide detector. The data in the range from 2.5 to 8.0 microns was obtained through the use of a Beckman IR–7 spectrophotometer manufactured by Beckman Instruments Co. A Nernst glower source was used with a thermocouple detector, the samples being examined in a polychromatic light beam. The operative setting was $f$–10. Corrections were made for surface reflection losses and also in the case of curve P for small area.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. As a new article of manufacture, an inhomogeneous optical lens comprising a transparent magnesia-alumina body in which the ratio of alumina to magnesia varies directly with the depth within the body in a plane transverse to the focal point of the lens and normal to the direction of radiation through the lens.

2. As a new article of manufacture, an inhomogeneous optical lens comprising a transparent magnesia-alumina body in which the ratio of alumina to magnesia varies directly with the depth within the body in a plane transverse to the focal line of the lens and normal to the direction of radiation through the lens.

References Cited by the Examiner

UNITED STATES PATENTS

| | | | |
|---|---|---|---|
| 2,448,511 | 9/48 | Barnes et al. | 117—121 X |
| 2,511,517 | 6/50 | Spiegel. | |
| 2,547,416 | 4/51 | Skellett et al. | |
| 3,026,210 | 3/62 | Coble | 106—39 |

JEWELL H. PEDERSEN, *Primary Examiner.*

JOHN K. CORBIN, *Examiner.*